US008406480B2

(12) United States Patent (10) Patent No.: US 8,406,480 B2
Grigsby et al. (45) Date of Patent: Mar. 26, 2013

(54) VISUAL CREDENTIAL VERIFICATION

(75) Inventors: Tavis M. Grigsby, Austin, TX (US); Mark E. Peters, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 865 days.

(21) Appl. No.: 12/372,491

(22) Filed: Feb. 17, 2009

(65) Prior Publication Data

US 2010/0209006 A1   Aug. 19, 2010

(51) Int. Cl.
*G06K 9/00* (2006.01)
*G05B 19/00* (2006.01)
(52) U.S. Cl. ........ 382/116; 382/115; 382/181; 340/5.21
(58) Field of Classification Search .......... 382/115–118, 382/124–127; 340/5.2–5.85
See application file for complete search history.

(56) References Cited

U.S. PATENT DOCUMENTS

| | | | |
|---|---|---|---|
| 6,335,688 B1 | 1/2002 | Sweatte | |
| 6,341,169 B1 * | 1/2002 | Cadorette et al. | 382/115 |
| 7,136,513 B2 | 11/2006 | Waehner et al. | |
| 7,827,410 B2 * | 11/2010 | Korosec | 713/183 |
| 2002/0073029 A1 * | 6/2002 | Cheaib et al. | 705/41 |
| 2003/0128099 A1 * | 7/2003 | Cockerham | 340/5.7 |
| 2005/0273866 A1 * | 12/2005 | Brown et al. | 726/28 |
| 2007/0098213 A1 | 5/2007 | Rhoads | |
| 2007/0250920 A1 * | 10/2007 | Lindsay | 726/7 |
| 2008/0127296 A1 * | 5/2008 | Carroll et al. | 726/1 |
| 2008/0269947 A1 * | 10/2008 | Beane et al. | 700/237 |
| 2009/0008446 A1 * | 1/2009 | Korosec | 235/380 |

FOREIGN PATENT DOCUMENTS

WO   WO2006127773 A1   11/2006

OTHER PUBLICATIONS

Margalit, "Identity Management Supplement Fusion Frenzy", Security Products, http://secprodonline.com/Articles/2007/01/24/Fusion-Frenzy.aspx?p=1, Jan. 24, 2007.
"Security Counterfeit Identification and Identification Fraud Raise Security Concerns", Statement of Robert J. Cramer, Managing Director Office of Special Investigations, United States General Accounting Office (GAO), Testimony Before the Senate Committee on Finance, Sep. 9, 2003.
Schneier, "Forged Credentials and Security", Schneier on Security, http://www.schneier.com/blog/archives/2006/01/forged_credenti.html, Jan. 13, 2006.

* cited by examiner

*Primary Examiner* — Anand Bhatnagar
*Assistant Examiner* — Soo Park
(74) *Attorney, Agent, or Firm* — Thomas E. Lees, LLC

(57) ABSTRACT

A solution for visual credential verification. The solution includes an apparatus, system, and method embodiment. The apparatus for visual credential verification includes an input module, a comparison module, and a response module. The input module receives from a security official an image of an unverified credential, such as a badge, that an individual has presented to the security official. The comparison module determines whether or not the unverified credential is valid or invalid. The determination includes comparing the image of the unverified credential with known good images of valid credentials. The comparison module may also compare authentication information such as a photo of the individual, a name, or a badge number, with known good authentication information. Based on the comparison module's determination, the response module notifies the security official that the unverified credential is either valid or invalid. A system for visual credential verification may be implemented with a server in communication with a security official's electronic device, such as a cell phone.

20 Claims, 7 Drawing Sheets

VISUAL CREDENTIAL VERIFICATION

BACKGROUND OF THE INVENTION

1. Field of the Invention

This invention relates to visually verifying the authenticity of badges or other security-related credentials.

2. Description of the Related Art

Badges are still one of the most common symbols of authority used throughout the world. Most security services, such as police forces, federal law enforcement, and even private agencies issue badges identifying the individual holding the badge as an authorized agent. Showing a badge is a common way of providing proof of authority to enter a restricted area, conduct a traffic stop, etc. However, a given individual is unlikely to be sufficiently familiar with a particular badge to know whether or not it is authentic, especially where the individual is simply a member of the public. Most people, when presented with a badge, simply assume that it is legitimate. This assumption, unfortunately, is not always justified. There are a number of reported cases of criminals posing as police officers and using a fake badge to gain unauthorized access or wrongfully take possession of property.

However, even when an individual wants to verify the authenticity of a badge, there is little information available to allow verification. Short of speaking with someone who can tell the individual how to determine whether or not the badge is authentic, the individual simply needs to either assume that it is or assume that it is not, in fact, authentic. Similar problems can affect other forms of identification or documents that purport on their face to be valid. For example, driver's licenses issue from fifty states, and most people, including security personnel, are not sufficiently familiar with the intricacies of each state to know whether the presented license is actually authentic. In short, when authorities present people with identification, they generally have to make an educated guess as to whether or not that identification is legitimate. Similarly, when an individual presents an authority with identification, that authority must often make a similar educated guess as to authenticity.

There is a need for a more rational system for determining authenticity of identification or other credentials. Ideally, such a system would allow a person to quickly and accurately verify whether an I.D. is valid or not.

SUMMARY OF THE INVENTION

Embodiments of the invention have been developed to provide an apparatus, method and system for visual credential verification.

The apparatus for visual credential verification is provided with an input module, a comparison module, and a response module. The input module is configured to receive from a security official a target image of an unverified credential that is presented to the security official. The unverified credential may be, for example, a badge or a driver's license. The input module may also receive authentication information of the individual presenting the unverified credential to the security official. The security official may generate the target image with a camera in a portable device and transmits the target image of the unverified credential to the input module over a wireless network.

The comparison module is configured to determine that the unverified credential is either a valid credential or an invalid credential. The determination includes, at least, comparing the target image with images of verified credentials and identifying an image of a verified credential, if any, that substantially matches the target image. In one embodiment, this basic determination may attempt to match only the structure of the credential, ignoring the actual picture of the individual on the credential. In another embodiment, this basic determination may attempt to match the credential in its entirety, including determining that the presented credential image matches the image of an authentic credential, thus ensuring that if the present individual looks like the person pictured on the credential, that he or she is the actual credentialed individual.

The comparison module may also compare the authentication information with verified authentication information that is provided by issuing authorities. Authentication information may include, for example, a badge number, a name, an image of the individual presenting the unverified credential, the location of the access attempt, and detailed information about the requested action. The verified authentication information identifies an authenticated individual entitled to use a particular credential. In one embodiment, the comparison module compares the authentication information with the verified authentication information only if it determines that there is an image of a verified credential that substantially matches the target image.

In certain embodiments, the comparison module assigns a likelihood value representing the likelihood that the unverified credential is valid. The comparison module determines that the unverified credential is valid if the unverified credential has a likelihood value that is greater than a threshold likelihood value. In certain embodiments, the threshold likelihood value is predefined. The comparison module may adjust the threshold likelihood value based on a security level of a requested action that the individual presenting the unverified credential wishes to perform.

In certain embodiments, the apparatus also includes a classification module that narrows a classification of images of verified credentials that are compared with the target image when the security official provides a classification of the unverified credential. The classification may be the name of the issuing authority, a jurisdiction, or a credential type.

The comparison module may also request verification from the issuing authority or some designee that the individual is allowed to request that action in that location at that time. For example, if the credential for a particular air marshal is being presented when the air marshal is known to be off duty, traveling in another location, or on a leave of absence, then the credential will be deemed invalid. In further embodiments, the security official may be requested to detain the alleged impersonator in response to the credential not being verified. In another embodiment, the detection of an impersonator may trigger an investigation or immediately dispatch personnel from oversight agencies in response to the credential not being verified.

The response module sends the security official a notification that the unverified credential is valid if the comparison module determines that the unverified credential is a valid credential. The response module sends the security official a notification that the unverified credential is invalid if the comparison module determines that the unverified credential is an invalid credential. The response module sending the security official a notification may involve either the response module sending the notification on its own (i.e., the notification is pushed to the security official) or may send the notification in response to a request (i.e., the notification is sent in response to the security official system polling and requesting the notification). The response module thus provides an invalid credential notification.

BRIEF DESCRIPTION OF THE DRAWINGS

Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
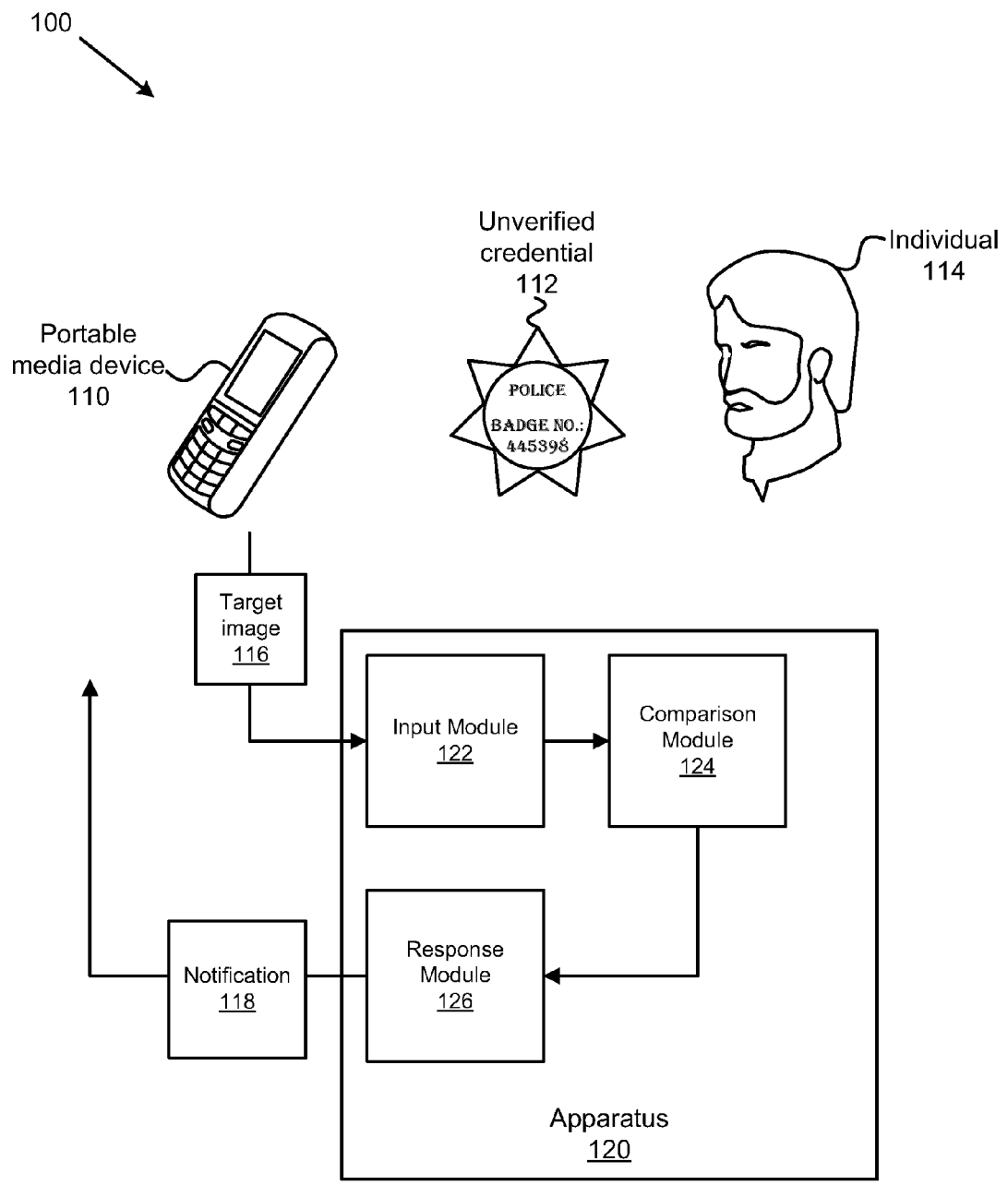
FIG. 1 is a block diagram illustrating one embodiment of a system for visual credential verification.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, or semiconductor system, apparatus, device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, or transport the program for use by or in connection with the instruction execution system, apparatus, or device. The computer usable program code may be transmitted using any appropriate medium, including but not limited to the Internet etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 illustrates a system 100 for visual credential verification. As shown, an individual 114 presents a user (not shown) with an unverified credential 112. The user may also be referred to as a security official. The security official can be any individual who needs to verify the validity of a particular unverified credential 112. For example, the security official may be a police officer, an airport security worker, a volunteer at a restricted event, an elections worker, or other users who need to verify credentials presented to them. The security official may also be a citizen presented with a credential by one who purports to have authority corresponding to that particular credential. Thus, a security official can be a person pulled over in a traffic stop or a person in his home dealing with individuals who are demanding access to his home. Those in the art will appreciate these and other situations where an individual needs to verify credentials and is thus a security official as the term is used in this application.

The unverified credential 112 is any item that purports on its face to be official identification that confirms the holder's position or status. In accordance with the present invention, an unverified credential conforms to a particular pattern or template that facilitates verification of the particular unverified credential 112 against a template. For example, police badges from a particular jurisdiction have a number of features that are common (e.g., size, shape, pattern, location of badge id number) even though each is unique in particular features (e.g., the name on the badge, the actual badge id, etc.). Even though the individual badges are unique, they conform to a particular template that defines common features.

The individual 114 is the holder of the particular unverified credential 112. The individual 114 may, for example, represent that he is a police officer and offer the unverified credential 112 as proof. Alternatively, the individual 114 may represent that he is a resident of the State of California, and the unverified credential 112 is a driver's license. The present invention is not intended to be limited to a particular form of unverified credential 112, nor to a particular type of individual 114.

A user, presented with the unverified credential 112 by the individual 114, may be unsure as to whether the unverified credential 112 is actually authentic. The user may be concerned that the unverified credential 112 is a fake and that the individual 114 is not actually authorized to perform a traffic stop. In accordance with the present invention, the user can use a portable device 110 as a verification tool prior to putting himself in a compromising position based on the individual 114's purported authority.

The portable device 110 is a device that can capture an image and transmit that image over a network. In one embodiment, the portable device 110 may be a cellular phone with a built-in camera, and which transmits data (such as an image) over a wireless telecommunications network. The portable device 110 may alternatively be a camera with network capability, whether wired or wireless.

In the embodiment shown in FIG. 1, the user uses the portable device 110 to capture a target image 116 of the unverified credential 112. In alternative embodiments, the user need not use a portable device 110 to capture and transmit the target image 116. For example, at an airport, a security screener may use an apparatus capable of generating an image of a driver's license which is then transmitted over a wired network connection. In such an embodiment, where the verification function is connected to a particular location (i.e., verifying the identity of an individual about to board a plane), the imaging device need not be portable.

The user transmits the target image 116 to the apparatus 120 that verifies the unverified credential 112. In one embodiment, the apparatus 120 is a server that is in communication with the portable device 110. The apparatus 120 may, for example, be an application server, a web server, a database server, or a combination thereof. In certain embodiments, all components of the apparatus 120 for visual credential verification are realized on a single server. In other embodiments, the apparatus 120 may, in fact, be a combination of a number of physically and/or logically separate servers. For example, the apparatus 120 may be one or more application servers that communicate with data stored in one or more database servers. The apparatus 120 may use one or more web servers to facilitate interactions with clients. The present invention is not limited to any particular physical or logical configuration of servers.

The apparatus 120 includes an input module 122, a comparison module 124, and a response module 126. The input module 122 is configured to receive from the user the target image 116 of the unverified credential 112 that the individual 114 presented to the user. The input module 112 may also be configured to receive authentication information of the individual 114 presenting the user with the unverified credential 112.

Authentication information includes details specific to the individual 114 or the unverified credential 112 that are unique to the particular unverified credential 112 or individual 114. Thus, while the target image 116 can be used to validate the unverified credential 112, authentication information can be used to validate the individual 114 presenting the unverified credential 112. For example, authentication information includes the particular badge number and the name of the individual 114, which may or may not be included on the unverified credential 112. Authentication information may also include an image (such as a photo) of the individual 114. It may also include biometric information for the individual 114.

Authentication information may be inherently included in the target image 116, as where the target image 116 of unverified credential 112 captures an image of the badge number or officer name. A user may alternatively have to enter authentication information separately. For example, the user may enter in the name or badge number in separate fields, or may take a picture of the individual 114 in addition to a picture of the unverified credential 112.

The apparatus 120 also includes a comparison module 124. The comparison module 124 is configured to determine whether the unverified credential is a valid credential or an invalid credential. The comparison module 124 does so using information about the unverified credential 112 and individual 114 and comparing it with verified information that is known to be legitimate. The determination may include comparing the target image 116 to images of verified credentials and identifying an image of a verified credential that substantially matches the target image 116.

Images of verified credentials are digital images available to the apparatus 120 that are known to be good images of valid credentials. For example, the apparatus 120 may include a database of digital images of valid police badges for each of the fifty states. If the unverified credential 112 is a police badge, the comparison module 124 compares the target image 116 of the unverified credential 112 (here, a police badge), with the images of police badges stored in the database.

In one embodiment, the comparison module 214 performs a true visual search; that is, the comparison module 214 generates a mathematical expression representing the target image 116 and compares it with the mathematical expressions representing images of verified credentials. The mathematical expressions may include a large number of variables to describe the image. If enough variables between the mathematical expressions of the target image 116 and a verified credential are identical, the comparison module 214 determines that there is a match. Visual search engines such as that provided by Riya Inc. to power the www.like.com search engine can be used to implement the image searching and comparison functionality of the present invention.

In one embodiment, the comparison module 214 selects the image of a verified credential that has the most variables in common with the target image 116. This image of the verified credential is the image that is most similar to the target image 116. The comparison module 214 can then assign a likelihood value that represents the likelihood that the unverified credential 112 is the same sort of credential that is represented by the image of the verified credential that is the most similar to the target image 116. In one embodiment, this likelihood value is based on the number of variables in common. The comparison module 124 can then compare this likelihood value with a threshold likelihood value. If the likelihood value is larger than the threshold value, than the comparison module 124 designates the two images to be a match and determines that the unverified credential 112 is valid. If the likelihood value is lower, the comparison module 124 determines that the unverified credential 112 is invalid.

In one embodiment, the threshold likelihood value is predefined. The comparison module 124 can also have multiple threshold likelihood values and select from among the various threshold likelihood values based on a security level associated with the action that the individual 114 wishes to perform. For example, if an individual wants to bring a gun on a plane, the comparison module 124 may use a much higher threshold than if the individual wants to use an I.D. as evidence of age. Alternatively, there may be a single base threshold likelihood value, which value is increased or decreased by a certain amount based on the security level of the action the individual 114 wishes to perform. Security levels are discussed in greater detail below.

The apparatus 120 also includes a response module 126. The response module 126 is configured to send the user a notification 118 that the unverified credential 112 is valid if the comparison module 124 determines that the unverified credential 112 is, in fact, a valid credential. Similarly, the response module 126 is configured to send the user a notification 118 that the unverified credential 112 is invalid if the comparison module 124 determines that the unverified credential 112 is an invalid credential.

If the comparison module 124 determines that the target image 116 does not match an image of a verified credential to a sufficient degree, the response module 126 provides a notification 118 indicating that the unverified credential 112 is invalid. The response module 126 may also include in the notification 118 information about the purported issuing authority (such as contact information) to allow the user to contact the proper authorities. For example, if an unverified credential 112 purports to be from the California Highway Patrol, but the comparison module 124 determines that the unverified credential 112 is not a valid California Highway Patrol badge, the response module 126 includes in the notification 118 the phone number for the California Highway Patrol.

The notification 118 can be an email, a text message, a webpage displayed on the portable device 110, or other communication format displayable in human-readable format. In certain embodiments, the response module 126 automatically contacts the authorities where an individual 114 has presented an unverified credential 112 that is determined by the comparison module 124 to be invalid. Where the portable device 110 is GPS-enabled, the response module 126 may also provide the authorities with the exact whereabouts of the user and request that a patrol car be sent to the location.

As discussed above, the user may also provide authentication information to the input module 122 that is specific to the particular unverified credential 112 or the individual 114. In one embodiment, the comparison module 124 also has access to a repository of verified authentication information. As discussed above, the comparison module 124 performs a comparison of the target image 116 with images of verified credentials. If the comparison module 124 determines that the target image 116 is an image of a verified credential, it may impose an additional test—namely, a check on the authentication information.

Thus, the comparison module 124 may also be configured to compare the authentication information of the individual 114 with verified authentication information, provided by an issuing authority, that identifies an authenticated individual associated with the authentication information if the comparison module identifies an image of a verified credential that substantially matches the target image 116. For example, the unverified credential 112 may include a badge number but not a name. The user asks the individual 114 for his name, and the individual 114 says his name is John Smith. The user can capture the target image 116 and also send the badge number (for example, 445398) and the name of the individual 114 to the apparatus 120. The comparison module 124 determines that the target image 116 matches an image of a verified credential. In this example, the comparison module 124 determines that the unverified credential 112 is a Utah state police badge.

The comparison module 124 then compares the authentication information provided by the user with verified authentication information provided by the Utah state police. In our example, the comparison module 124 may determine that the badge number 445398 is issued to Officer Frank Hernandez, not John Smith. In this instance, even though the comparison module 124 determined that the unverified credential 112 is a Utah state police badge, it still determines that the unverified credential 112 is an invalid credential because the authentication information provided was incorrect.

The response module 126 sends the user a notification indicating that the unverified credential 112 is invalid if the comparison module 124 determines that the authentication information of the individual 114 fails to match the verified authentication provided by the issuing authority. Thus, in the example above, the notification 118 alerts the user that John Smith is not an authorized individual associated with the Utah State police badge having the badge number the user provided. The notification 118 may also direct the user to contact the authorities.

Figure 2:
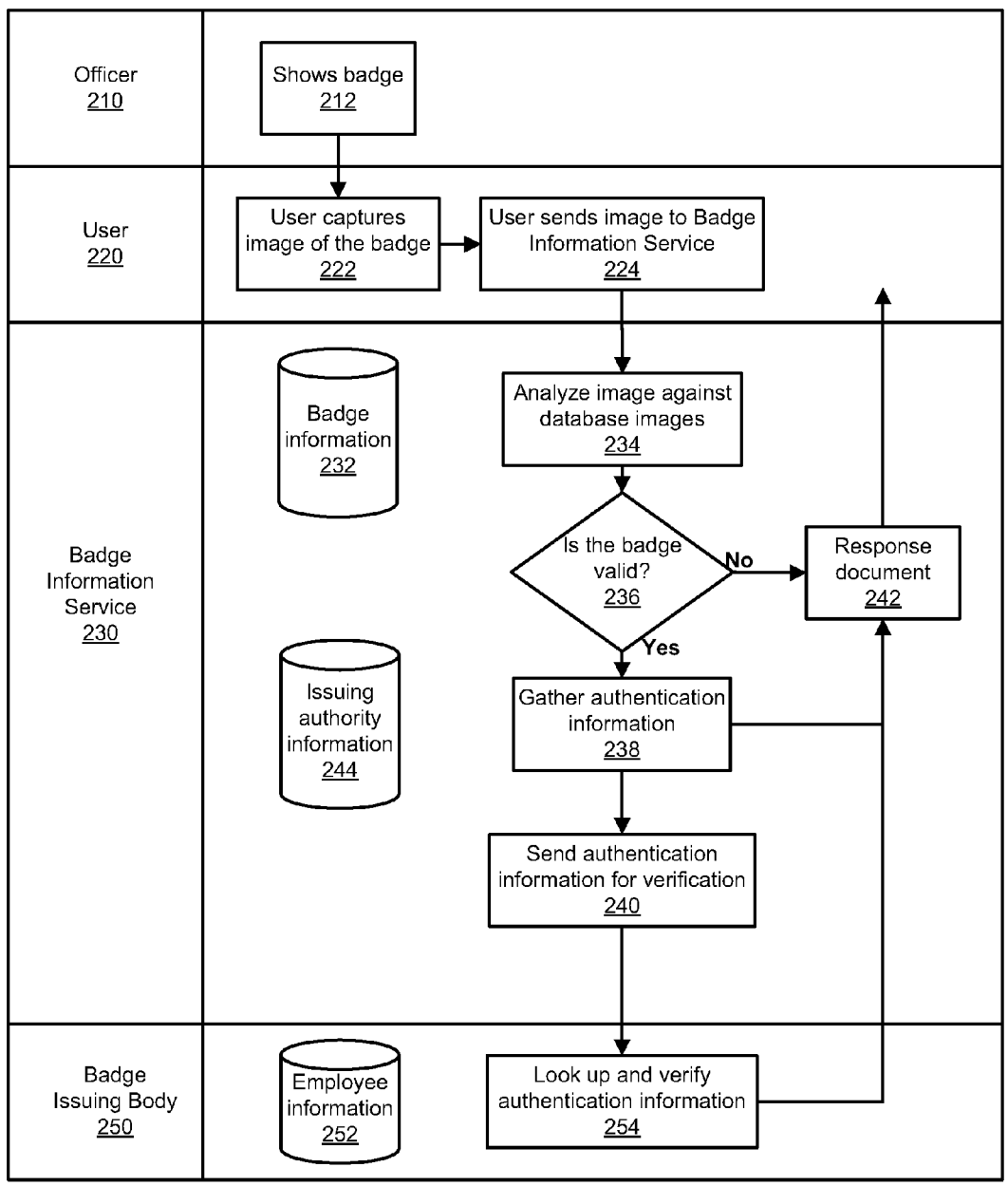
FIG. 2 is a schematic block diagram illustrating an embodiment of a system for visual credential verification.

FIG. 2 is a schematic block diagram illustrating an exemplary division of tasks and information in a system implementing the present invention. An officer 210 shows 212 a badge to a user 220. As noted above, the designation of an 'officer 210' is simply illustrative; the present invention is not limited to any particular holder of an unverified credential. The user 220, unsure of whether the badge is actually legitimate, captures 222 an image of the badge. The user 220 may, for example, take a picture of the badge using a cell phone camera. The user 220 then sends 224 the image to a badge information service 230.

In one embodiment, the badge information service 230 is a private service. The badge information service 230 could also be a government-provided service. The badge information service 230 may be implemented as a web service that executes on remote servers. The badge information service 230 includes data stores or databases containing badge information 232 and issuing authority information 244. In one embodiment, the badge information service uses this information to verify the particulars of the badge and the officer 210.

Upon receipt of a request from the user 220, the badge information service 230 analyzes 234 the image against images stored in one or more databases. For example, the badge information 232 repository may store images of a variety of valid badges throughout the particular jurisdiction. In one embodiment, the comparison module 124 performs this comparison as described above. The badge information service 230 determines 236, based on the image analysis, whether the badge presented by the officer 210 is valid on its face. That is, it determines whether or not the image of the badge substantially matches an image of a valid badge stored in the badge information 232. If not, the badge information service 230 adds information to a notification that informs the user 220 that the badge appears to be invalid, and may provide additional supporting information as well.

If the badge is determined to be a substantial match of an image in the badge information 232 data store, the badge information service gathers 238 authentication information. The user 220 may have entered the authentication information initially and sent it along with the image at step 224. In an alternative embodiment, the badge information service 230 prompts the user 220 to enter authentication information only after the badge information service 230 has verified that an image of the badge substantially matches an image in its database.

In an alternative embodiment, the badge information service 230 may gather the authentication information from the image itself. For example, the badge information service 230 may also include issuing authority information 244. The issuing authority information 244, in one embodiment, stores verified authentication information for all badges included in the badge information 232. For example, the badge information 232 may include an image of a valid FBI badge. The issuing authority information 244 stores authentication information related to that particular badge. The issuing authority information 244 may store the information identifying the issuing authority and contact information of the matching valid image in the badge information 232. It may also indicate the coordinates of where on the badge the badge id is located. It may also include a valid range of badge numbers on valid FBI badges. Other information, such as where the name is located on the badge, may also be included in the issuing authority information. The issuing authority information 244 may also specify actions which a holder of a valid FBI badge is permitted to perform.

Using the issuing authority information 244, the badge information service 230 may perform additional validations. For example, knowing which section of the image is the badge id, the badge information service 230 may convert the particular portion from an image to a string or integer representation that can be validated against the valid range specified in the issuing authority information 244. The badge information service 230 may also write issuing authentication information 244 to the response document 242 for the benefit of the user 220.

The badge information service 230, in one embodiment, also sends 240 the authentication information to a badge issuing body 250 for verification. In such an embodiment, the issuing authority information 244 may also specify the location, access methods, APIs, or other known means for accessing a service provided by the badge issuing body 250. For example, the authentication information may include a name, badge number, and an image of the officer 210. The badge issuing body 250 may have valid employee information 252 stored internally that can be used to verify the authentication information send by the badge information service 230. The badge issuing body 250 looks up 254 and verifies the authentication information using the employee information 252. Those of skill in the art will appreciate that there are likely numerous badge issuing bodies 250, and not a single body as shown for illustration purposes in FIG. 2.

In one embodiment, for security purposes, the employee information 252 is kept separate from the badge information service 230 by the badge issuing body 250. In such an embodiment, the badge issuing body 250 may simply perform the check and tell the badge information service 230 which elements in the authentication information correctly match and which do not. Such an embodiment may add an additional level of protection to the employee information 252. In an alternative embodiment, the employee information needed to perform the authentication is simply provided to the badge information service 230. The badge information service 230 may create and maintain one or more local copies of the employee information 252 instead of invoking the remote badge issuing body 250 service to validate the authentication information.

The results of the authentication information 254 verification are also added to the response document 242 which is sent to the user 220. In addition, if the authentication information fails to match at the badge issuing body 250 layer, the badge issuing body 250 may alert its employees of the mismatch. The badge issuing body 250 may create a record of each mismatch for later review and further investigation. The user 220 can then review the response document 242 after all layers of verification are complete, and determine the appropriate action to take based on his new knowledge of the validity or invalidity of the badge presented by the officer 210.

Figure 3:
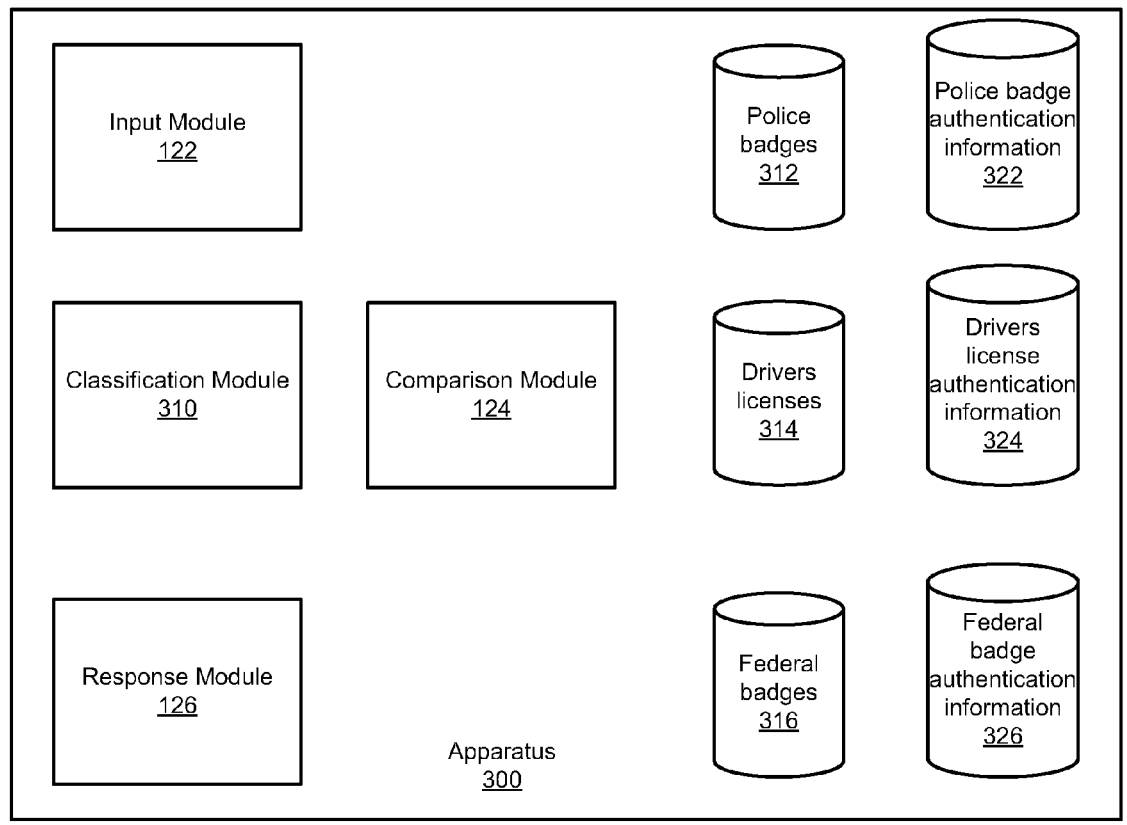
FIG. 3 is a schematic block diagram illustrating an embodiment of an apparatus for visual credential verification.

FIG. 3 is a schematic block diagram illustrating a second embodiment of an apparatus for visual credential verification. The apparatus 300 includes an input module 122, a comparison module 124, and a response module 126 as described above. In addition, the apparatus 300 includes a classification module 124, and data repositories 312-316 and 322-326 storing image and authentication information as described in greater detail below.

The classification module 310 is configured to narrow a classification of images of verified credentials that are compared with the target image received from the user. Thus, the user may provide a classification and the classification module 310 appropriately limits the comparison to the relevant class. The classification is a relevant limitation of the unverified credential that distinguishes it from other types of credentials. For example, the classification could be the issuing authority, a jurisdiction, or a credential type.

For example, the user may indicate that the unverified credential is a police badge type. Or, the user may indicate that the unverified credential is a state-issued id, or that he is within the jurisdiction of a particular state. Alternatively, if the user is using a GPS-enabled device, the apparatus 300 may automatically gather location information and use it as a location classification; that is, it may restrict the comparison to one between the target image and images of credentials that are valid at that particular location.

For example, the user may indicate that the unverified credential purports to be a police badge. The classification module 310 could then direct the comparison module 124 to restrict the image comparison to those images stored in police badges 312. The user may also provide multiple classifications to narrow the search. For example, the user could specify that the unverified credential purports to be a police badge and is from the state of California. This classification information allows the apparatus 300 to perform searching, comparison, and validation much more quickly and efficiently.

While FIG. 3 shows different repositories for different exemplary classifications including police badges 312, driver's licenses 314, and federal badges 316, those of skill in the art will appreciate that the repositories need not be separate physical or logical database or data stores. Similarly, the authentication information shown in 322-326 need not be separate databases or data stores.

As described above, the comparison module 124 compares the target image with images of verified credentials and identifying an image of a verified credential that substantially matches the target image. Identifying an image of a verified credential that substantially matches the target image also includes determining that no image substantially matches the target image. Thus, the comparison module 124 need not identify a substantial match in every case, and in many cases may determine that there is no substantial match.

Where the user specifies that the unverified credential is a police badge, the classification module 310 directs the comparison module 124 to limit the comparison to images of verified credentials within police badges 312. If the comparison module 124 does not find a substantial match in police badges 312, it determines that the unverified credential is invalid without performing comparisons with the images within drivers' licenses 314 and federal badges 316.

In one embodiment, as described above, the comparison module 124 may additionally compare authentication information of the individual (whether input by the user or derived from the target image) with verified authentication information such as police badge authentication information 322. In the event of a mismatch between the authentication information and the verified authentication information, the response module 126 sends a notification stating that the unverified credential is invalid.

As discussed above, the police badge authentication information 322 may be stored locally on the apparatus 300 or may be stored by the issuing authority. In addition, certain pieces of police badge authentication information 322 (such as a valid range of badge ids) may be saved on the apparatus 300 while more sensitive information (name—badge number—officer image) may be stored and maintained by the issuing authority.

In a further embodiment, the comparison module 124 may prompt the security official to pose a challenge question to the individual presenting the unauthorized credential. A challenge question is a question that has a demonstrably correct answer. The user may enter the challenge answer provided by the individual and send it to the comparison module 124. The comparison module 124 can then compare the challenge answer provided with a verified challenge answer.

For example, a challenge question may be the name of the individual's supervisor, last four digits of a social security number, an extension number, of other question with a clear answer that is readily known if the individual is actually authorized. If the individual provides an incorrect challenge answer, the comparison module 124 instructs the response module 126 to report that the credential is invalid.

Figure 4:
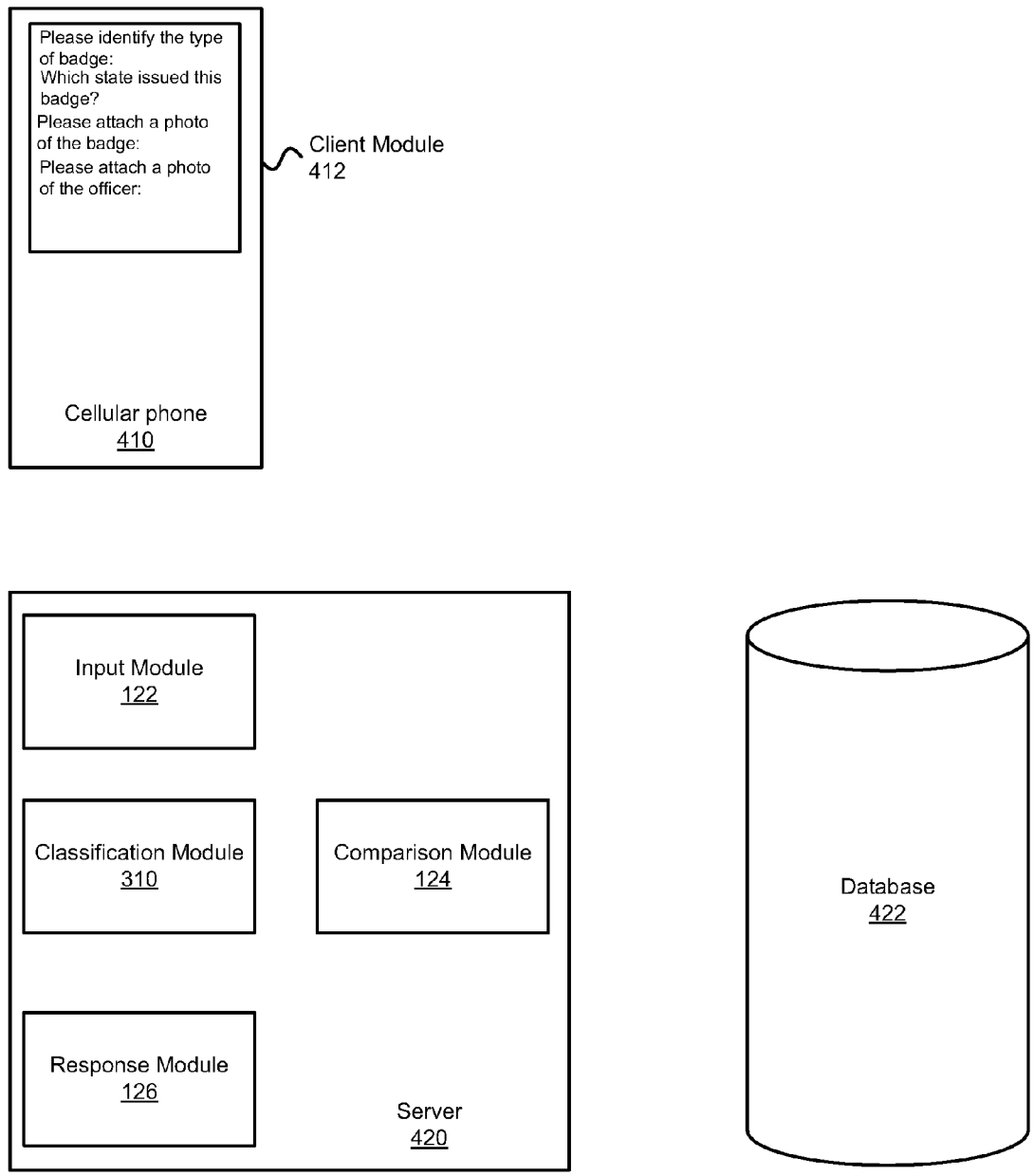
FIG. 4 is a schematic block diagram illustrating an embodiment of a system for visual credential verification.

FIG. 4 illustrates an exemplary implementation of a system for visual credential verification. The system includes a server 420 implementing an input module 122, classification module 310, comparison module 124, and a response module 126 as described above. The server may be an application server, a web server, or other server configuration known to those in the art, or a combination thereof. The server includes a processor and memory.

FIG. 4 also shows a cellular phone 410 as an example of an electronic device of the user that can be used in the system to transmit unverified credential information and authentication information to the server 420. In one embodiment, the electronic device executes a client module 412. The client module is configured to transmit the target image of the unverified credential, and the authentication information, to the input module 122. The client module 412 executes on the user's electronic device.

In one embodiment, the client module 412 is an application stored locally on the cellular phone 410. The client module 412 may alternatively be implemented as a webpage that is accessed from a web browser on the cellular phone 410. In both instances, the client module 412 executes on the cellular phone 410. The client module 412 guides the user through the image-capture process and prompts the user for authentication information. The client module 412 may, for example, specify that the user take a picture of the unverified credential from a certain angle in order to facilitate comparison with verified images. The client module 412 may also provide initial image assessment to ensure that the quality of the target image is sufficient to enable comparison.

In one embodiment, the client module 412 hides the details of connection to the server 420 from the user. In such an embodiment, the user may simply tell the client module 412 to send the target image and the authentication information, and the client module 412 appropriately directs the image and authentication information in an expected format to the input module 122. The input module 122 may expect, for example, an XML file. The client module 412 properly arranges the information provided by the user into the format expected by the input module 122. Alternatively, the user may send the information to the input module 122 as an email message, a text message, SMS text, or other transmission approach known to those in the art.

Also shown is a database 422. As described above, the database 422 may store images of verified credentials and verified authentication information on computer-readable media. The database 422 may be remote from, but communicatively connected to, the server 420. The database 422 may execute on the same hardware as the server 420, or may be physically and logically separate.

Figure 5:
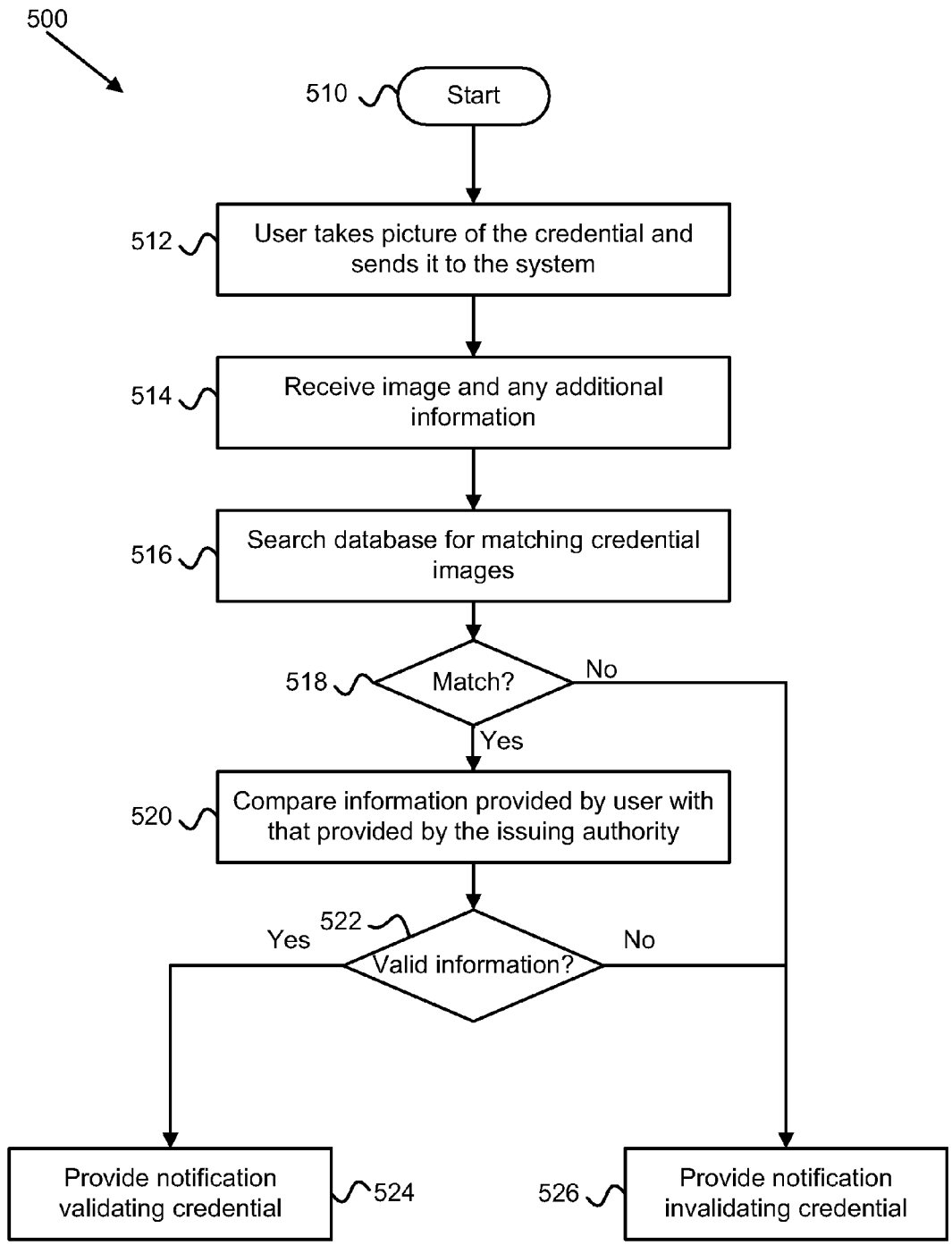
FIG. 5 is a schematic flow chart diagram illustrating a method for validating a credential.

FIG. 5 is a schematic flow chart showing one embodiment of a method for verifying a credential in accordance with the present invention. The method starts 510 and a user takes 512 a picture of the unverified credential and sends it to the system, such as the apparatus 300. The input module 122 receives 514 the target image and any additional authentication information that the user provides. The comparison module 124 searches 516 the database for images of verified credentials that substantially match the target image. If the comparison module 124 determines 518 that there is no match, the response module 126 notifies 526 the user that the unverified credential is invalid.

If the comparison module 124 determines 518 that there is a match, it compares 520 authentication information provided by the user with the verified authentication information provided by the relevant issuing authority. The comparison module 124 then determines 522 whether there is a correct match. If there is not a match, the authentication information is deemed invalid and the response module 126 notifies 526 the user that the unverified credential is invalid. If the comparison module 124 determines that the authentication information is also valid, the response module 126 notifies 524 the user that the unverified credential is valid.

Figure 6:
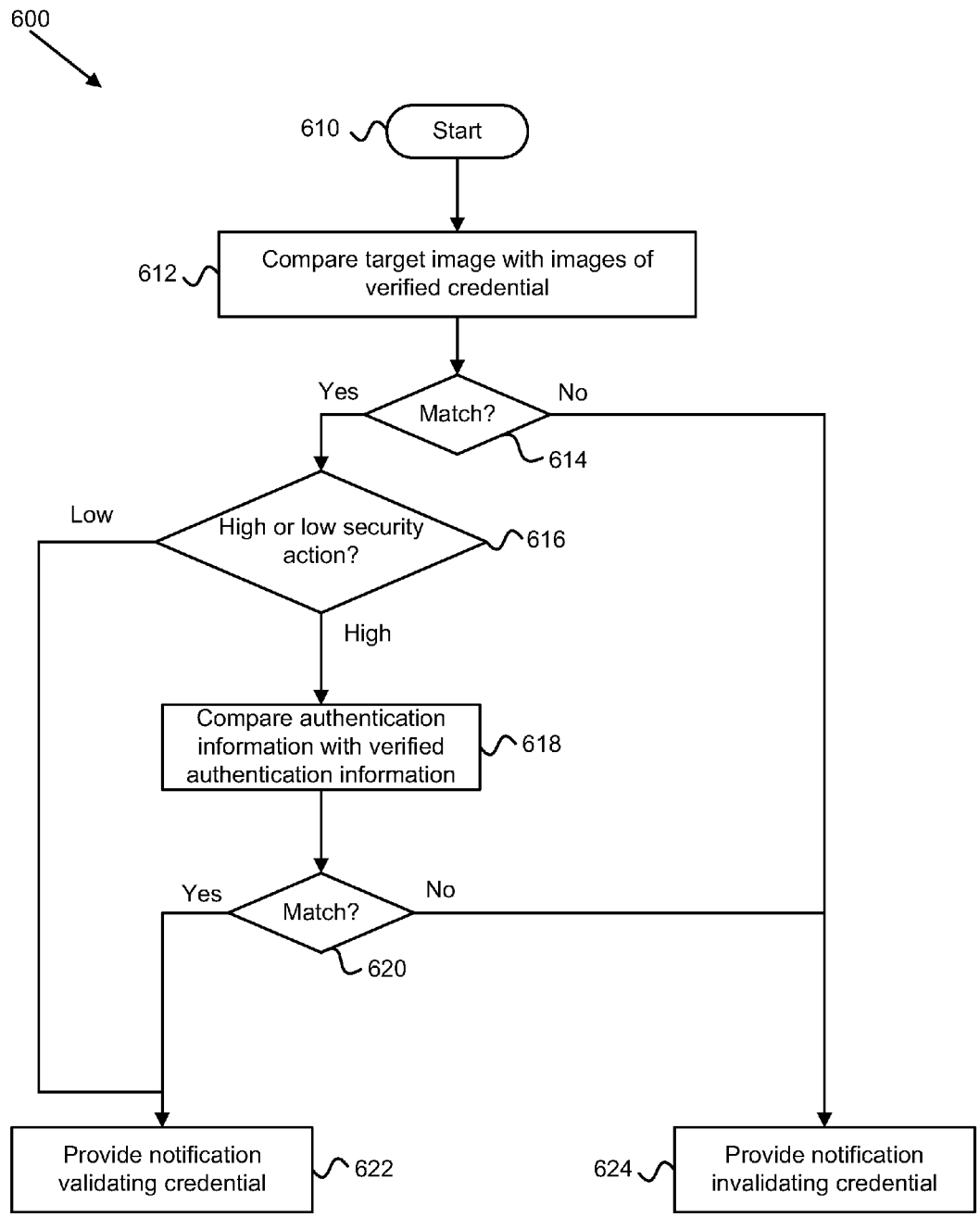
FIG. 6 is a schematic flow chart diagram illustrating a variant method for validating a credential.

FIG. 6 illustrates an additional embodiment of a method 600 for performing visual credential verification. The method starts 610 with the comparison module 124 comparing 612 the target image provided by the user with images of verified credentials, and identifying an image of a verified credential, if any, that substantially matches the target image. The comparison module 124 determines 614 whether or not there is a match. If not, the response module 126 notifies the user that the unverified credential is invalid.

If the comparison module 124 finds a match, it then determines 616 whether the action is a high-security action or a low-security action. In one embodiment, the client module 412 provides the user with the option of defining what action the individual with the unverified credential wishes to perform. The user may enter a description of the requested action, or select an action from a drop-down list provided by the user. Those of skill in the art will appreciate that there are various means for receiving a classification of the requested action as high or low security, and that the present invention is not limited to any particular implementation. In one embodiment, the client module 412 prompts the user to select a list of descriptive terms that identify the circumstances in which the user is found, and the nature of the requested action. The comparison module 124 is pre-programmed to identify all possible combinations and assign a high-security or a low-security designation.

For example, the user may indicate that the individual with the unverified credential is writing a traffic ticket in a well-lit populated area. The comparison module 124 may determine that this is a low-security situation. In contrast, the individual may wish to enter the user's remote residence late in the evening. The comparison module 124 may determine that this is a high-security situation.

In one embodiment, if the comparison module 124 determines 616 that the action is a low-security action, the matched image is sufficient and the response module 126 provides notification 622 to the user indicating that the unverified credential is valid. If the comparison module 124 determines 616 that the action is a low security action, it compares authentication information of the individual presenting the unverified credential, provided by the user, with verified authentication information. This represents a second check on the authenticity of the individual in particularly sensitive situations.

If the comparison module 124 determines 620 that the authentication information matches the verified authentication information, the response module 126 provides 622 notification that the unverified credential is valid. If the authentication information does not match the verified authentication information, the response module 126 provides 624 notification that the unverified credential is invalid.

Figure 7:
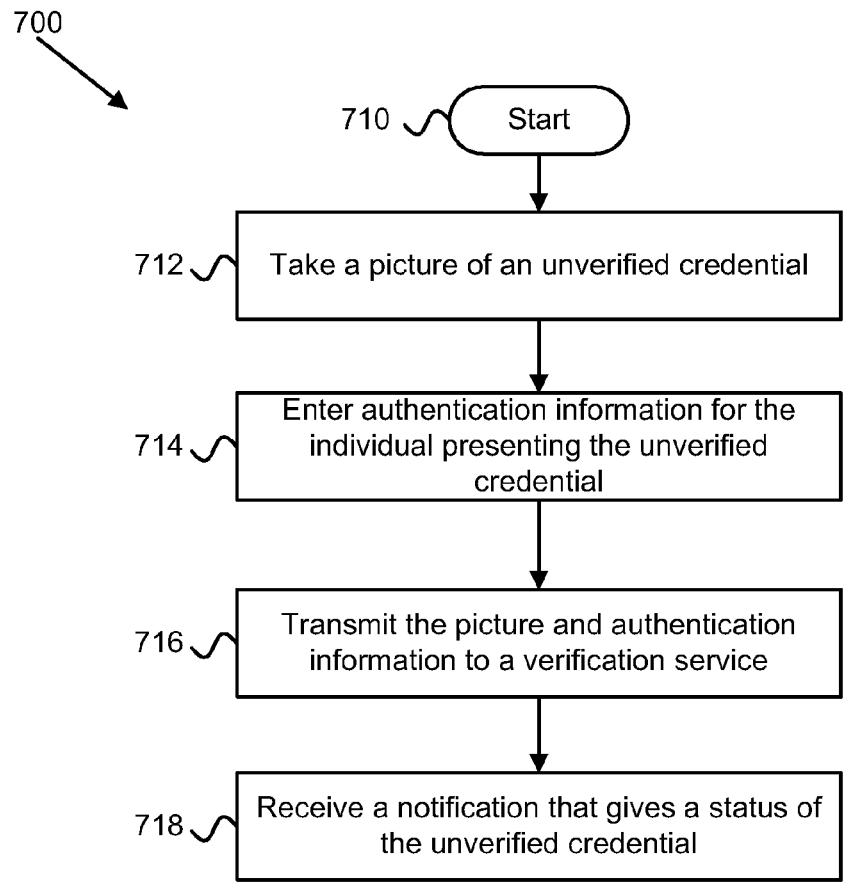
FIG. 7 is a schematic flow chart diagram illustrating a method for a security official to validate a credential in accordance with the present invention.

FIG. 7 is a schematic flow chart diagram illustrating one embodiment of a method 700 for verifying an unverified credential in accordance with the present invention. The method begins 710 and the user 712 takes a picture of an unverified credential that is presented by an individual. In one embodiment, the user takes the picture using a camera on a cellular phone that has a camera. The user also enters 714 authentication information for the individual presenting the unverified credential. As described above, authentication information may include a badge number, a name of the individual, and an image of the individual.

The user then transmits 716 the picture and the authentication information to a verification service such as the one disclosed above. In one embodiment, the user transmits this information via a text message or an email. In another embodiment, the cellular phone includes a client module that guides the user through the data collection process and facilitates sending the data to the proper location and in an expected format.

Of note is the fact that the automated verification service is independent of the individual presenting the unverified credential. For example, a badge may include a phone number to call for verification. However, the individual may have put that phone number of the false badge in an improper attempt to gain the confidence of the public. Calls to that number may be directed to an associate of the individual who tells the user that the unverified credential is valid as part of a ruse to allow the individual to wrongfully gain access to property. In contrast, the present invention is independent of the individual and immune from this sort of problem.

The user receives 718 a notification on the cellular phone that represents that the unverified credential is either valid or invalid. Because the assessment is made by a third-party that is divorced from the particular transaction, the validation assessment can be viewed with confidence. With information that the badge is either valid or invalid, the user can take appropriate steps to ensure that he is properly complying with authorized law enforcement while protecting himself from harm.

What is claimed is:

1. A method for visual credential verification, the method comprising:
   assigning a security level to a requested action prior to validating an unverified credential;
   validating, by a processor, the unverified credential if an image of the unverified credential matches at least one verified credential image to a degree above a first determined threshold, and if the requested action has a low-security level, wherein the validating is performed independently of comparing authentication information of an individual presenting the unverified credential with verified authentication information; and
   validating, by the processor, the unverified credential if an image of the unverified credential matches at least one verified credential image to a degree above a second determined threshold, if the requested action has a high-security level, and if the authentication information of the individual presenting the unverified credential is above a third determined threshold when compared to verified authentication information.

2. The method of claim 1, further comprising invalidating the unverified credential if the image of the unverified credential is above the second determined threshold when compared to at least one verified credential image, if the requested action has a high-security level, and if the authentication information of the individual presenting the unverified credential is below the third determined threshold when compared to verified authentication information.

3. The method of claim 1, further comprising invalidating the unverified credential if the image of the unverified credential is below the first determined threshold when compared to at least one verified credential image and if the requested action has a low-security level.

4. The method of claim 1, further comprising invalidating the unverified credential if the image of the unverified credential is below the second determined threshold when compared to at least one verified credential image and if the requested action has a high-security level.

5. The method of claim 1, further including deriving the authentication information inherently from the image of the unverified credential.

6. The method of claim 1, wherein the unverified credential is an identification badge.

7. The method of claim 1, wherein the second threshold is different than the first threshold.

8. An apparatus for visual credential verification comprising:
   an input module configured to receive an image of an unverified credential and authentication information;
   a comparison module configured to:
      assign a security level to a requested action prior to validating an unverified credential; and
      determine that the unverified credential is one of a valid credential and an invalid credential, wherein the determination comprises:
         validating the unverified credential if the image of the unverified credential is above a first determined threshold when compared to at least one verified credential image and if the requested action has a low-security level, the validating performed independently of comparing the authentication information of an individual presenting the unverified credential with verified authentication information; and
         validating the unverified credential if the image of the unverified credential is above a second determined threshold when compared to at least one verified credential image, if the requested action has a high-security level, and if the authentication information of the individual presenting the unverified credential is above a third determined threshold when compared to verified authentication information;
   a response module configured to send a notification that the unverified credential is valid in response to the comparison module determining that the unverified credential is the valid credential.

9. The apparatus of claim 8, wherein the input module is further configured to receive the authentication information separately from the image of the unverified credential.

10. The apparatus of claim 9, wherein the verified authentication information is provided by an issuing authority.

11. The apparatus of claim 8, wherein the authentication information comprises one or more of a badge number, a name, and an image of the individual.

12. The apparatus of claim 8, wherein:
   the input module is further configured to receive a classification of the unverified credential; and
   the apparatus further comprises a classification module configured to narrow a classification of verified credential images that are compared with the image of the unverified credential based on the classification of the unverified credential.

13. The apparatus of claim 12, wherein the classification comprises one or more of an issuing authority, a jurisdiction, and a credential type.

14. The apparatus of claim 8, wherein the input module is further configured to receive the image of the unverified credential over a network.

15. The apparatus of claim 8, wherein the authentication information further includes an answer to a security question.

16. A computer-readable storage device with an executable program stored thereon to implement visual credential verification, wherein the program instructs a microprocessor to:
   assign a security level to a requested action prior to validating an unverified credential;
   validate the unverified credential if an image of an unverified credential matches at least one verified credential image to a degree above a first determined threshold, and if the requested action has a low-security level, wherein the validating is performed independently of comparing authentication information of an individual presenting the unverified credential with verified authentication information; and
   validate, by the processor, the unverified credential if an image of an unverified credential matches at least one verified credential image to a degree above a second determined threshold when compared to at least one verified credential image, if the requested action has a high-security level, and if the authentication information of the individual presenting the unverified credential is above a third determined threshold when compared to verified authentication information.

17. The computer-readable storage device of claim 16, wherein the image of the unverified credential is received from an electronic device with image-capturing capability.

18. The computer-readable storage device of claim 16, wherein the program further instructs the processor to invalidate the unverified credential if the image of the unverified credential is below the first determined threshold when compared to at least one verified credential image and if the requested action has a low-security level.

19. The computer-readable storage device of claim 16, wherein the program further instructs the processor to invalidate the unverified credential if the image of the unverified credential is below the second determined threshold when compared to at least one verified credential image and if the requested action has a high-security level.

20. The computer-readable storage device of claim 16, wherein the program further instructs the processor to derive the authentication information inherently from the image of the unverified credential.

* * * * *